United States Patent [19]

Gibson

[11] Patent Number: 4,892,009
[45] Date of Patent: Jan. 9, 1990

[54] BULLET BICYCLE PEDAL

[76] Inventor: Peter O. Gibson, 1445 Casino Cir., Silver Spring, Md. 20906

[21] Appl. No.: 209,006

[22] Filed: Jun. 20, 1988

[51] Int. Cl.$^4$ ............... G05G 1/14; A43B 5/00
[52] U.S. Cl. ............... 74/594.6; 74/594.4; 36/131
[58] Field of Search ............... 74/594.6, 594.5, 594.4; 36/131, 132, 42; 280/611, 11.3

[56] References Cited

U.S. PATENT DOCUMENTS

| 550,409 | 11/1895 | Hanson | 74/594.6 |
|---|---|---|---|
| 598,325 | 2/1898 | McIntyre | 74/594.6 |
| 1,393,256 | 10/1921 | Wright | 74/594.5 |
| 2,582,551 | 1/1952 | Malherbe | 36/42 |
| 3,964,343 | 6/1976 | Lauterbach | 74/594.6 |
| 4,214,384 | 7/1980 | Gonzalez | 36/42 |
| 4,538,480 | 9/1985 | Trindle | 74/594.6 X |
| 4,570,363 | 2/1986 | Annovi | 36/132 |
| 4,685,351 | 8/1987 | Pegg | 74/594.4 |
| 4,716,784 | 1/1988 | Schlotterer | 74/594.6 |

FOREIGN PATENT DOCUMENTS

| 0106162 | 4/1984 | European Pat. Off. | 74/594.6 |
|---|---|---|---|
| 3602329 | 7/1987 | Fed. Rep. of Germany | 74/594.6 |

Primary Examiner—Vinh T. Luong

[57] ABSTRACT

A bicycle pedal has two opposed tracks defined by a set of longitudinally contiguous surfaces. Each track is bilaterally symmetric with a central convex surface, two adjacent co-planar surfaces and two perpendicular side surfaces. Each side surface extends dihedrally inward, above a co-planar surface. Each track is slightly wider at the free end of the pedal than the end fixed to the crank arm. A shoe cleat has a bottom central concave surface, adjacent co-planar surfaces and side diheral surfaces which mate with the corresponding pedal track surfaces in longitudinal engagement. A fully sculptured lead is attached to the free end of the pedal which has an exterior flush with the central convex surface and adjacent co-planar surfaces of both pedal tracks. The lead tapers axially to an apex co-linear with the longitudinal axis of the pedal and approximates an oblate half ellipsoid about this axis with fins lying between and in front of the opposed pedal tracks.

3 Claims, 1 Drawing Sheet

U.S. Patent    Jan. 9, 1990    4,892,009
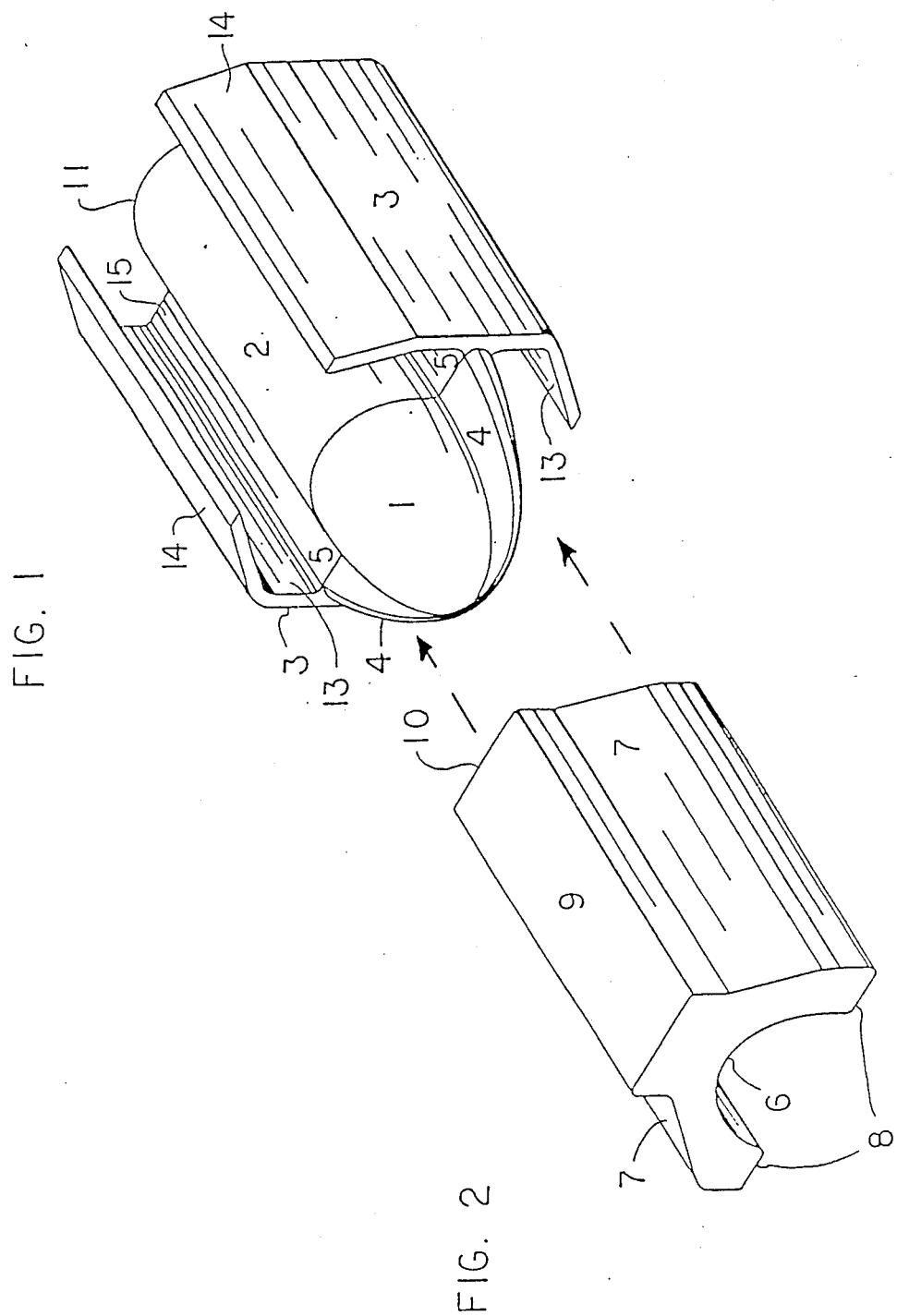

BULLET BICYCLE PEDAL

BACKGROUND OF THE INVENTION

The current invention relates generally to foot operated pedals and specifically to bicycle pedals operated in conjunction with shoe cleats.

Effective transmittal of torque between a cyclist's shoe and the pedal is crucial to cycling efficiency. A compromise with safety is observed. Rigid attachment of shoe to pedal achieves optimal efficiency in enabling the transmission of force evenly throughout the full rotation of the crank, but totally abandons safety. A platform pedal presents no impediment to safety, but only allows application of force in a downward stroke. The toe clip and strap used with a grooved cleat compromises; the tighter the strap, the more efficiency had and safety sacrificed. Recent ski binding type adaptations requiring a rotation of the shoe relative the pedal to effect release involve a similar compromise.

An alternative approach employing tracked pedals and shoe cleats shaped for lateral engagement is considered. It enables the secure transmittal of force throughout the full rotation of the crank as well as unimpeded disengagement. The practical problem preventing implentation is rotational orientation of the pedal tracks with the shoe cleat. One solution places the pedal tracks below the spindle axis, which maintains a given rotational orientation by virtue of gravity. This denies the use of an outboard bearing, however, and is mechanically unsatisfactory in regard to normal loading of the structure.

There thus remains a need for a bicycle pedal which will enable optimal efficiency and complete safety which is mechanically reliable.

SUMMARY OF THE INVENTION

The object of the curreent invention is provision for effective means of aligning and engaging substantially parallel tracks upon a bicycle pedal with a suitably shaped shoe cleat. The pedal's free end has a lead, which, when in contact with a concave surface on the cleat, orients the pedal about its axis of rotation and guides the alignment of the cleat with said axis.

Lateral insertion, engagement and removal are all facilitated by a slight angle given the tracks upon the pedal and of the corresponding cleat surfaces such that the free end track width exceeds that of the fixed end. Four exterior pedal surfaces, parallel and normal to each other, are spaced substantially equidistant from said rotational axis so the concave bottom cleat surface has a stable platform for pushing downward on the pedal while not engaged.

BRIEF DESCRIPTION OF THE DRAWINGS

FIG. 1 is an isometric view of a preferred embodiment of the present invention.

FIG. 2 is an isometric view of the congruent shoe cleat.

DETAILED DESCRIPTION OF THE INVENTION

Motion of a bicycle pedal is restricted to rotation about its spindle, or longitudinal axis, which is always normal to the crank arm and hence the bicycle. Also, the length of the pedal is constant and thus a cyclist can reliably find the end of the pedal with a cleat attached to the bottom of a shoe. FIG. 2 shows a cleat having a top surface 9 which would abutt a shoe's sole. As seen in FIG. 1, the pedal is symmetric with respect to vertical and horizontal planes through the longitudinal axis. The bottom half of the pedal thus duplicates that seen.

Contact of the bottom surfaces 6 and 8 of the cleat by the pedal lead fins 4, being unstable, will cause the pedal to rotate about its spindle to equilibrium. The bottom co-planar surfaces of the cleat 8 will rest against said lead fins which are flush with the lateral plates 5 of the pedal.

The cleat can then be inserted laterally to the bicycle, parallel to the longitudial axis of the pedal, into the adjacent track. The pedal possesses two substantially identical, opposed tracks. The upper track seen in FIG. 1 is defined by the opposed, longitudinally contiguous surfaces of the body 2, flanges 3, and the lateral plates 5. The head of the lead 1 will guide the cleat in longitudinal alignment with the pedal.

Lateral engagement of cleat with pedal, parallel to the longitudinal axis of the pedal as seen in FIG. 1 has the upper dihedral cleat surfaces 7 in contact with the interior dihedral surfaces 13 of the flanges 3. An angle given these cleat and pedal surfaces with respect to the longitudinal axis of the pedal, such that the smaller end of the cleat 10 fits the smaller end of the pedal 11, provides a stop at full engagement and ease in lateral insertion and removal. At full engagement, the concave and dihedral cleat surfaces 6 and 7, and opposed convex and dihedral pedal surfaces 12 and 13, respectively, are in full contact, assuring correct depth and security of engagement.

The material and manufacture of the pedal and of the cleat are largely matters of choice. The cleat might be aluminum, extruded and or machined, or molded plastic. But a formed steel piece would work nicely also. The pedal presents several options also. The lead 1 and 4 suggests casting or molding, either in aluminum or a hard plastic. But it could be machined on a three axis mill with proper expertise from an aluminum alloy.

The body of the pedal 2, together with the flanges 3 and the lateral plates 5 might all be extruded in an aluminum alloy as one piece, with secondary machining and or finishing. Or each said component might be separately produced and subsequently assembled. The body might be an aluminum alloy cylinder, the flanges, stainless steel formed with a press and the lateral plates machined from aluminum alloy. Connection of these parts would be by any suitable means of fastening. Inside the body 2 a spindle and pair of ball bearing races, standard to industry practice in the manufacture of better pedal, is assumed.

Four exterior surfaces 14 of the pedal flanges 3 are inclined at an angle of forty-five degrees with respect to both vertical and horizontal planes. The relation between any two adjacent said surfaces is substantially identical: normal, or perpendicular with respect to each other. The distance between the parallel edges of opposed flanges is idential from the pedal's symmetry. This distance is arbitrary. An equivalent distance is used as spacing between adjacent dihedral exterior surfaces 14 for each flange 3 upon the sides.

The pedal thus presents four faces which are substantially identical from point of view of a cleat having an exposed concave surface 6 wider than said distance between flange edges. Each said face, presenting two perpendicular surfaces equidistant from the longitudinal axis of the pedal, provides a symmetric platform enabling an equilibrium condition in the exertion of force downward by said concave cleat surface. One of the said four faces is easily found by a shoe cleat for any rotational orientation of the pedal about the longitudinal axis. Provision is thus made for use of the pedal in a mode other than lateral engagement by said cleat. This facilitates mounting of the bicycle in particular.

The shape of the pedal lead 1 and 4 is critical to the present invention. Though symmetric with respect to horizontal and vertical planes normal the longitudinal axis of the pedal, said lead 1 and 4 must have exterior surfaces flush with the combination of pedal body 2 and lateral plates 5. The head of the lead 1 must be tapered from this abuttment with the pedal to an apex in both vertical and horizontal planes. It may be approximated as half of a solid ellipsoid about the longitudinal axis of the pedal, excepting the juncture with the fins 4. Elongation of the lead head 1 into said lateral fins 4 must be a smooth transition to facilitate the rotation of the lead to equilibrium during contact by the cleat.

It is understood that the fore going description is exemplary to the preferred embodiment of the principles relating to the current invention and are not to be construed as being in any manner restrictive of such.

In order to secure by Letters Patent, I hereby claim:

1. A bicycle pedal enabling lateral engagement of a cleat;

said pedal comprising a spindle with a longitudinal axis, a body, two lateral plates, two side flanges and a lead;

said pedal having two opposed substantially identical bilaterally symmetric tracks substantially parallel said longitudinal axis, said body having two exterior convex surfaces, a free end, a fixed end and two sides, each said lateral plate extended along said body in opposition to each other and having two opposed substantially parallel surfaces, each said flange disposed substantially perpendicular either said lateral plate in aposition to each other and further extended symmetrically over a portion of both said opposed surfaces of one said lateral plate, each said track bounded by a bilaterally symmetric set of longitudinally contiguous surfaces comprising one said body central convex surface with two substantially co-planar laterally adjacent surfaces and two laterally distal side surfaces in aposition defining the width of said track, each said laterally distal side surface further projecting inwardly in juxtaposition to said central convex surface, said lead attached said body free end and possessing two opposed bilaterally symmetric exterior surfaces, each said lead exterior surface being flush said central convex surface and both substantially co-planar laterally adjacent surfaces of one said track, said lead further tapering away from said pedal tracks to an apex coincident said longitudinal axis.

2. A pedal in accordance with claim 1 wherein the width of each said track is slightly greater at said free end than said fixed end.

3. A pedal in accordance with claim 1 wherein both said flanges each have two dihedral exterior surfaces substantially equidistant from and parallel said longitudinal axis disposed substantially perpendicular each adjacent dihedral exterior surface.

* * * * *